Oct. 3, 1950 D. I. LAWSON 2,524,530

SCANNING CIRCUITS, PARTICULARLY FOR TELEVISION APPARATUS

Filed Dec. 15, 1947

Inventor
DENNIS ILLINGWORTH LAWSON
By
Blair, Curtis & Hayward
Attorneys.

Patented Oct. 3, 1950 2,524,530

UNITED STATES PATENT OFFICE 2,524,530

SCANNING CIRCUITS PARTICULARLY FOR TELEVISION APPARATUS

Dennis I. Lawson, Cambridge, England, assignor to Pye Limited, Cambridge, England, a British company Application December 15, 1947, Serial No. 791,843
In Great Britain December 14, 1946

1 Claim. (Cl. 315—27)

(Granted under the provisions of sec. 14, act of March 2, 1927; 357 O. G. 5)

The present invention relates to scanning circuits for cathode ray and like apparatus, and is particularly suitable for use in television receivers.

It is known to provide a limiting diode across the circuit connecting the output transformer of the scanning generator to the deflecting coils. According to the present invention the voltage drop across this diode or equivalent rectifier is employed as a source of bias voltage for other components of the apparatus.

In one form of the invention, the cathode of the diode or equivalent rectifier is connected to earth, and a resistance is connected between the cathode and the deflector coil circuit whereby the end of this cathode resistance remote from the cathode assumes a negative potential with respect to earth which provides a convenient source of bias voltage for operating auxiliary circuits.

According to a feature of the invention, this bias voltage is applied to augment the high tension voltage applied to the output stage of the scanning generator. The invention provides a simple method of increasing the high tension voltage in this stage which is of particular advantage in television receivers intended for operation from D. C. mains supply.

Figure 1:
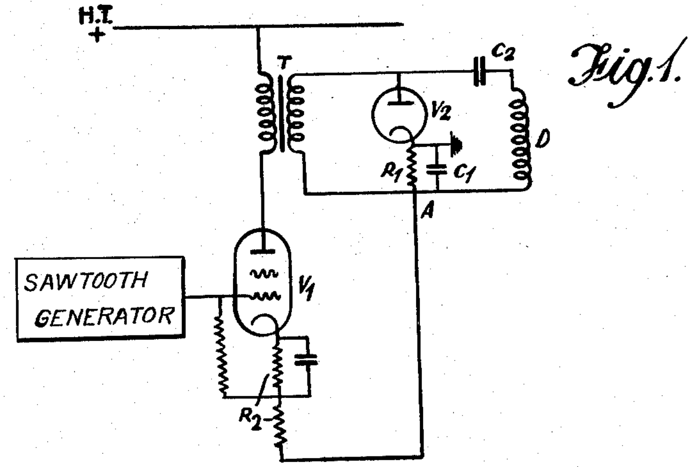
Figure 2A:
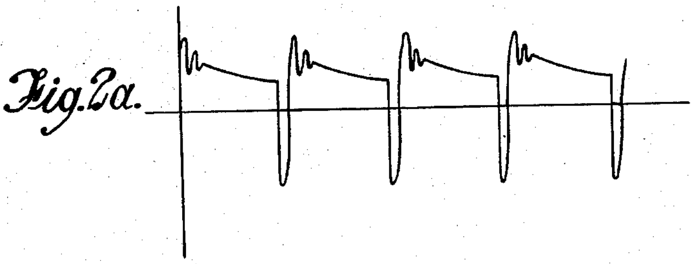
Figure 2B:
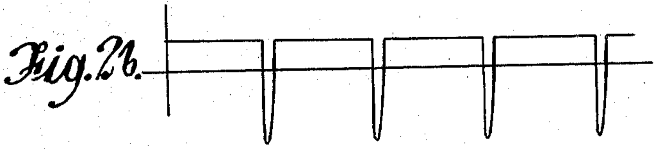

The invention will be more clearly understood with reference to the accompanying drawings in which:

Figure 1 shows a circuit diagram of a line scanning circuit according to the invention;

Figures 2*a* and 2*b* show the waveforms across the deflector coils.

Figure 3:
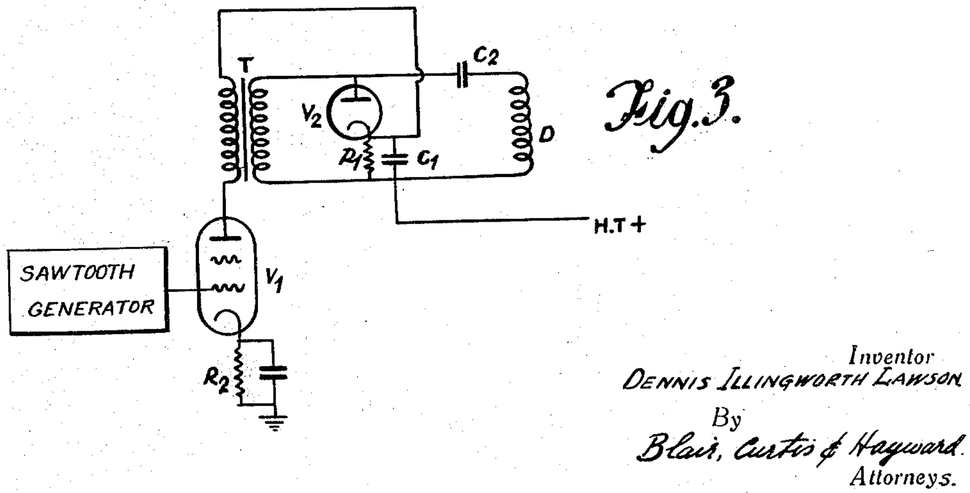

Figure 3 shows a modified circuit diagram.

Referring to Figure 1, V1 is the output amplifier valve of a line scanning generator, which latter may comprise a self-oscillating valve producing a sawtooth current waveform which is applied to the grid of the output valve $V_1$. The anode of the valve $V_1$ is coupled to the line deflecting coils D of the cathode ray tube F by means of the transformer T.

The deflecting coils D will appear as an inductance at the primary of the transformer T so that, during the forward trace part of the scanning waveform, the anode voltage will be lowered below the high tension line voltage by an amount $$L\frac{di}{dt}$$

Where L is the inductance reflected in the primary of the transformer T and $$\frac{di}{dt}$$

is the rate of increase of the current flowing through the amplifier valve. While this is linear $$\frac{di}{dt}$$

will be constant. At the end of a scansion the grid voltage is lowered corresponding to the flyback of the sawtooth and the valve becomes non-conducting. The anode potential then rises because the current flowing in the inductance L cannot be rapidly stopped and this charges up the stray capacity to ground associated with the anode of the valve $V_1$. Because the magnetic energy is converted to electrostatic energy, we have:

$$Li^2=CV^2$$

that is $$V=i\sqrt{\frac{L}{C}}$$

Where

C is the stray capacity between anode and earth
$i$ is the maximum current through the valve $V_1$ and
V is the peak anode voltage.

The capacity C will discharge itself into the inductance L and a damped oscillation will ensue at the anode of the valve. This oscillation in the circuit through the transformer primary, and hence through the deflecting coils D, causes the rate of scanning to vary. The voltage across the deflecting coils will have the form shown in Fig. 2*a*. This variation may be removed by connecting a diode V2 across the secondary winding of the circuit in such a way as to cut away the oscillation. The voltage across the deflecting coils D then has the form shown in Fig. 2*b*.

According to the present invention, the voltage drop across the diode during the scanning periods is employed as an auxiliary bias voltage for the valve V1. This is achieved in the embodiment shown in Fig. 1, by connecting the cathode of the diode V2 to earth and, through a resistance R1, to one side of the secondary winding of the transformer T. The point A is then connected to the end of the resistance R2 in the cathode circuit of the output valve V1.

With this circuit the point A assumes a negative potential with respect to earth, the valve of which will be determined by the voltage drops produced by the current in the cathode circuit of the valve V1 flowing both through the resistor R1 to earth and also through the secondary winding of the transformer T and the diode V2 to earth. The high tension voltage across the valve V1 is thus effectively increased, by depressing the cathode circuit thereof below earth potential by an amount corresponding to the negative potential of point A.

The alternating components are removed from this auxiliary bias voltage by means of the bypass condenser C1. A blocking condenser C2 is connected in series with the deflecting coil D to prevent D. C. currents from flowing through the coil and causing the raster to shift.

Fig. 3 shows a modified circuit in which the auxiliary bias voltage derived from the voltage drop across the diode V2 is applied as a positive voltage in the anode of the valve V1 instead of as a negative voltage to the cathode circuit of V1 as described with reference to Fig. 1. In this modified circuit the negative end of the resistance R1 is connected to the positive high tension supply and the cathode of the diode V2 is connected to the anode of the valve V1 through the primary winding of the transformer T.

With either embodiment the valve of the resistance R1 is not critical and, in fact, the circuits can be designed so that the D. C. current through the valve V1 is equal to the current through the diode V2, in which case R1 may be made infinite, that is left out altogether.

Whilst the invention has been particularly described in connection with biassing the output valve V1 of the line scanning generator, it will be understood that the auxiliary bias voltage obtained according to this invention can be used for biassing other circuits or components of the television apparatus.

I claim:

Cathode ray apparatus comprising a cathode ray tube, a deflecting coil associated with said tube, a sawtooth waveform generator, an amplifier valve for amplifying the output from said generator, a transformer coupling said amplifier valve to the deflecting coil, a limiting diode having a resistance connected in series with its cathode lead connected across the transformer secondary winding, a by-pass condenser shunting said resistance, a blocking condenser connected in series with the deflecting coil to prevent D. C. current from flowing through the coil, an earthed connection to the cathode of said diode, and means connecting the end of said resistance remote from said diode cathode to the cathode circuit of said output amplifier valve.

DENNIS I. LAWSON.

REFERENCES CITED

The following references are of record in the file of this patent:

UNITED STATES PATENTS

| Number | Name | Date |
|---|---|---|
| 2,074,495 | Vance | Mar. 23, 1937 |
| 2,153,655 | Urtel et al. | Apr. 11, 1939 |
| 2,308,908 | Bahring | Jan. 19, 1943 |
| 2,431,051 | Kozanowski | Nov. 18, 1947 |
| 2,438,359 | Clapp | Mar. 23, 1948 |
| 2,440,418 | Tourshou | Apr. 27, 1948 |
| 2,451,641 | Torsch | Oct. 19, 1948 |
| 2,470,197 | Torsch | May 17, 1949 |
| 2,474,474 | Friend | June 28, 1949 |
| 2,477,557 | Torsch | July 26, 1949 |
| 2,478,744 | Clark | Aug. 9, 1949 |